United States Patent [19]

Asip et al.

[11] 4,361,851

[45] Nov. 30, 1982

[54] SYSTEM FOR REMOTE MONITORING AND DATA TRANSMISSION OVER NON-DEDICATED TELEPHONE LINES

[76] Inventors: William F. Asip, 340 E. 52nd St., New York, N.Y. 10022; Miklos L. Bartha, 11 Meade Ave., Passaic, N.J. 07055

[21] Appl. No.: 109,624

[22] Filed: Jan. 4, 1980

[51] Int. Cl.³ .............................................. H04N 7/10
[52] U.S. Cl. ...................................... 358/84; 358/86; 455/2; 455/5
[58] Field of Search .................... 358/84, 86; 455/2, 3, 455/5; 179/2 AS, 2 AM, 2 DP; 340/151, 152 T, 152 R

[56] References Cited

U.S. PATENT DOCUMENTS

| | | | |
|---|---|---|---|
| 3,676,580 | 7/1972 | Beck | 358/84 |
| 3,733,430 | 5/1973 | Thompson et al. | 358/84 |
| 4,014,004 | 3/1977 | Fuller | 455/2 |
| 4,086,434 | 4/1978 | Bocchi | 179/2 AM |
| 4,150,254 | 4/1979 | Schussler et al. | 179/2 DP |

*Primary Examiner*—Joseph A. Orsino, Jr.
*Attorney, Agent, or Firm*—Anthony H. Handal; Michael N. Meller

[57] ABSTRACT

A system, consisting of a plurality of Remote Monitoring Units and a Central Computer, for automatically monitoring the selection of a Program Source made by a Subscriber. Each Remote Monitoring Unit has a microprocessor, associated Program and Data Memory, and Control and Interface circuitry. Each of the remote monitoring units maintains a software implemented real-time-clock. When a selection has been made by a Subscriber, the time of day and channel identification (ID) is recorded in the onboard memory.

Communication with the central office computer is initiated by the remote monitoring unit at preprogrammed intervals over the conventional voice telephone network using the individual Subscriber's telephone line. Communication with the central office computer is via frequency shift keyed audio tones. The data sent is the information required to generate billing based on Subscriber viewing, and consists of a unique identity code for each monitoring unit, the channels selected by the Subscriber, and the time of each selection. The remote monitoring unit is capable of receiving messages from the central computer and retransmitting the stored data in the event of an unsuccessful contact, as well as disabling the program selector and access device on command.

The remote monitoring unit accesses the Subscriber's telephone line via an integral telephone interface device, and avoids conflict with normal use of the telephone line.

6 Claims, 2 Drawing Figures

SYSTEM FOR REMOTE MONITORING AND DATA TRANSMISSION OVER NON-DEDICATED TELEPHONE LINES

GENERAL DESCRIPTION OF THE INVENTION

This invention implements a network for remotely monitoring individual Subscriber use of a service. Information relating to the time of day and duration of such use, as well as data relating to the specific character of the service accessed is retained in the monitoring unit until such time as contact is established with a Central Computer monitoring and billing facility. The current embodiment of the invention is oriented toward use with cable television systems or over-the-air pay television scrambled systems and permits the construction of a "Pay Per Play" Program network.

The remote monitoring unit is installed in the individual Subscriber's home. A conventional Cable TV converter/program selector, modified to provide selection information to the remote monitoring unit processor, is used by the Subscriber to access channels of programming. The processor stores the time-of-day when a particular channel is accessed in its data memory. Whenever a change in the channel being viewed occurs (i.e. A New Selection Is Made), this new time and channel information is also stored in the data memory. A list is thus maintained in the monitoring unit indicating the times and channels accessed by the Subscriber.

The processor maintains, via programmed software routines, a 24 Hr. clock which is used to generate the time information. The number of channels monitored as well as the number of selection data packets which can be retained is theoretically quite large and is limited by purely practical manufacturing considerations.

The remote monitoring unit is connected in parallel across the Subscribers' home telephone line by the means of a telephone interface unit. At pre-programmed intervals the processor attempts to communicate its stored data to the Central Office Computer, by automatically dialing the central office number. On contact with the Central Office Computer a stream of ASCII encoded alphanumeric data is transmitted by the remote monitoring unit as a sequence of frequency shift keyed audio tones within the voice bandwidth limits of the conventional telephone system.

The data transmitted uniquely identifies the monitoring unit, and contains the list of subscriber program access data maintained in the data memory. On successful completion of a data transmission the remote monitoring unit receives information from the Central Office Computer as to the accuracy of the transmission as well as control data relating to the Subscriber's continued use of the service. In the event of unpaid accounts or for other causes, the Central Computer can terminate service by sending a message directing the remote monitoring unit to turn off the program access device.

It can be readily perceived that this system constitutes a sophisticated data collection, storage and transmission facility capable of bi-directional communication via the non-dedicated telephone network. The capability of the remote monitoring unit's processor to perform complex data gathering and processing is characterized solely by the programs stored in program memory. The uses of such a system are not restricted to Pay-TV Applications but can also include:

Remote monitoring and reading of water, gas and electric meters.
Home security and surveillance.
Access to centralized public database networks.
Selection of products or services in the home to be processed by a central sales or service facility for direct home delivery and subsequent billing.
Electronic funds transfer.
Opinion polling and preference sampling.

Current Systems for implementing any of the above functions, either via a Cable Television System, or Network of CATV Systems, or over the non-dedicated Telephone Network, lack the simplicity, programmable versatility and intelligence, and functional expandability of this invention.

DETAILED DESCRIPTION

Figure 1:
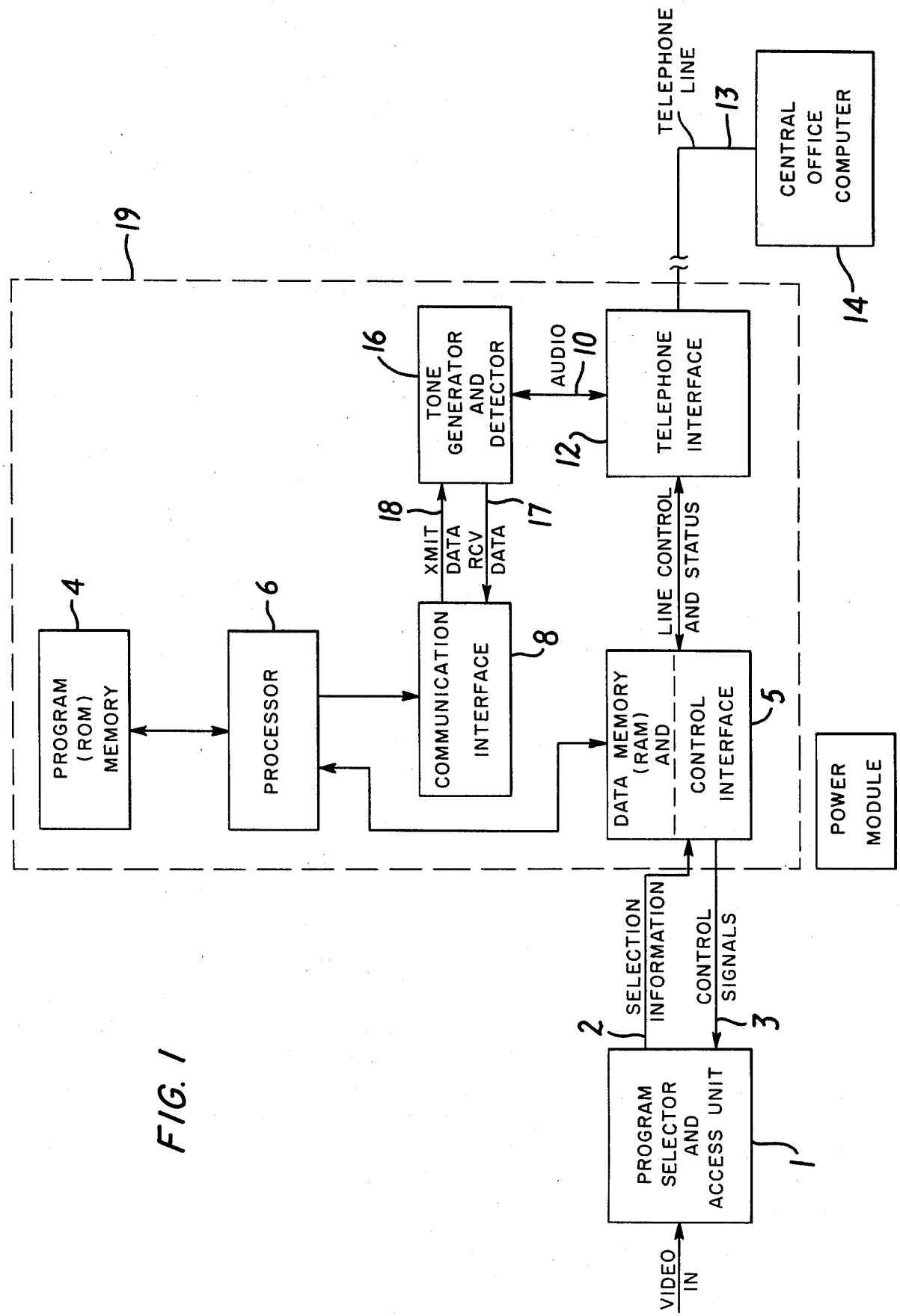
FIG. 1 is a functional block diagram of the invention
Figure 2:
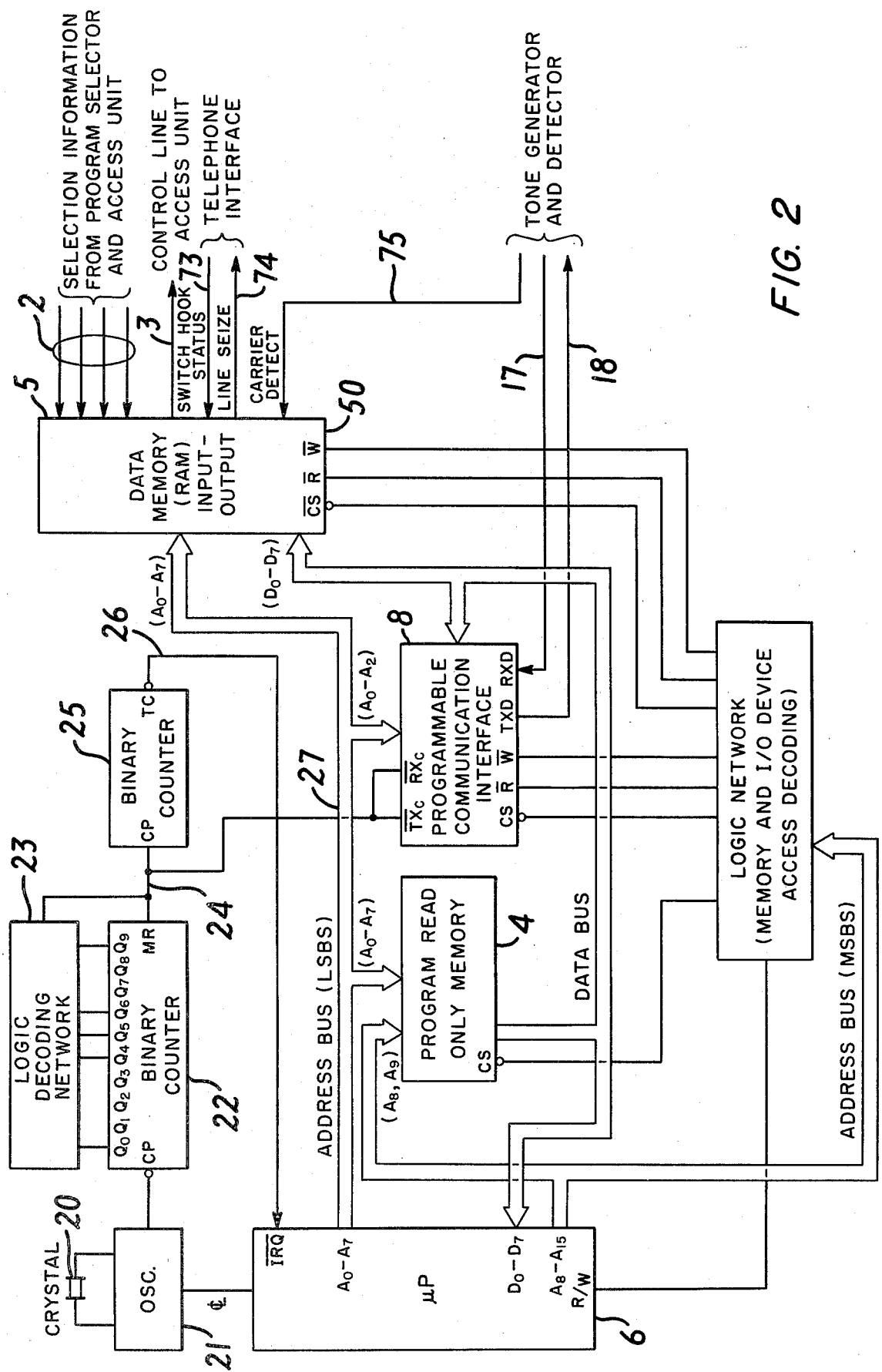
FIG. 2 is a more detailed diagram of some of the elements of FIG. 1.

Referring to FIG. 1 there is shown a diagram of the preferrd embodiment of the invention as a "Pay Per Play" T.V. Subscriber selection monitoring and data transmission remote monitoring Unit 19. The program selector and access Unit 1 feeds channel selection information to the remote monitoring Unit 19 via four signal lines 2. The channel selection information is formatted as binary TTL logic levels and is periodically scanned under program control by Processor 6 through control Interface 5.

Processor 6 is programmed via software routines permanently stored in Program Memory 4 to periodically compare the current state of the selection Data Lines 2 with the last selection made by the Subscriber, which is stored in Data Memory 5. In the event of a change in selection has occurred the Processor 6 sets a flag stored in Data Memory 5 and enters a software timing loop. If the Subscriber does not change his most recent selection within one minute the selection will be stored in Data Memory 5 as billing data. If the selection is changed before one minute expires the new selection becomes the reference for the timing loop and the previous selection is discarded. This implements a "grace period" for previewing a selection and possibly changing it before billing data is stored.

A 24 hour real time clock is maintained by Processor 6 by means of a software routine stored in Program Memory 4. Processor 6 is a microprocessor chip, typically a 6502 or similar device. A 1 MHz crystal 20, in conjunction with a conventional oscillator circuit 21, generates the necessary clock pulses for Processor 6. The 1 MHz pulses are also fed to Binary Counter 22 which is reset periodically by Logic Decoding Network 23 to generate a 1600 Hz Signal 24. Signal 24 is the receive and transmit clock for communications interface circuit 8. Signal 24 is also fed to Binary Counter 25 which divides by 16 and produces a 100 Hz clock pulse 26. This pulse train 26 is applied to the interrupt input of Processor 6. Hence every 10 ms Processor 6 goes into an interrupt service routine defined by the software in Program Memory 4.

During this interrupt routine the memory locations in Data Memory 5 dedicated to retaining current time are updated. During the interrupt routine Processor 6 also services program Selection Data 2, Communications Interface 8, and Telephone Interface 12, is any of these functions are currently active. Data Memory 5 is a 128 location by 8 bit wide Ram Memory. Of these locations 32 are reserved for program work space leaving 96 available for subscriber selection data. A selection is stored as two bytes of time data, hours and minutes, and 1 byte of channel selection identification. Thus 32 different selections can be stored before Data Memory space is consumed. The four lines used for Selection Information 2 limits the maximum number of selections currently recognized by the system to 16. It is readily apparent that by adding additional circuit devices the above restrictions are eliminated and the only restrictions to the number of data points and events which can be monitored and stored, are practical considerations of manufacture and specific application need.

At intervals predetermined by the software the Remote Monitoring Unit 19 attempts to transmit the subscriber selection data to the Central Office Computer 14 over the subscribers home telephone line 13. The module which permits the Processor 6 to communicate over the home Telephone Line 13 is the Telephone Interface 12.

The Telephone Interface 12 generates a Signal 73 which indicates the switch hook status, that is, whether the phone is in use or free. The Line Seize Signal 74 permits the Processor 6 to access the telephone line and to generate dial pulses. In addition, the telephone interface 12 provides the necessary isolation and audio conditioning to permit the connection of the Remote Monitoring Unit to a conventional subscriber telephone network.

When initiating a data exchange with the Central Office Computer 14, the Processor 6 checks to see if the home Telephone Line 13 is free by inputting switch hook status data from Telephone Interface Unit 12 via Control Interface 5. If the line is busy the Processor 6 continues to check the line status at random intervals until the line is free. At this point the Processor 6 outputs a logic level on Line Seize input 74 causing the telephone interface unit to place an impedance on the Telephone Line 13 simulating the start of a call and requesting a dial tone. The Processor 6 waits for 3 seconds and assumes that a dial tone is present on the line. At that point the Processor 6 enters an autodial subroutine stored in Program Memory 4. This subroutine causes the Processor 6 to pulse the Line Seize data line 74, causing the Telephone Interface 12 to remove and replace the impedance across the Telephone Line 13 simulating the dialing of a conventional telephone. The telephone number of the central office computer 14 is programmed in Program Memory 4. The autodial software routine generates the necessary mark-space timing to dial this pre-programmed number.

An automatic answering unit is provided at the Central Office Computer site 14 which picks up the line automatically and signals the successful establishing of the call by transmitting a 1000 Hz tone for 0.5 seconds over Telephone Line 13. This tone is fed via Telephone Interface 12 over Audio Line 10 to Tone Generator and Detector module 16 which detects the tone and generated a logic level carrier detect signal 75. The Processor 6 checks Signal 75 via Control Interface 5.

If the return tone is not detected Processor 6 assumes an unsuccessful dialing and releases Telephone Line 13, and attempts to redial a random interval later.

If successful contact is established the Processor 6 proceeds to transmit the selection data in Data Memory 5. Transmission of data is accomplished under software control via routines programmed in Program Memory 4, by sequentially loading data bytes into Communications Interface 8. The Transmit Data output 18 is a serial pulse train which causes Tone Generator 16 to produce an FSK modulated audio tone within the frequency passband of a voice grade telephone line which is fed via audio line 10 to telephone interface 12 and out over telephone line 13 to central computer 14.

The message transmitted by Remote Monitoring Unit 19 to the Central Office Computer 14 consists of a number uniquely identifying the remote monitoring unit followed by a sequential listing of all selection data stored in memory prior to the current transmission and after the previous transmission. The selection data sent consists of time of day and a channel number for each selection.

When the transmission is complete the Remote Monitoring Unit 19 expects a return message from the Central Office Computer 14. The central computer scans the received message for gross errors or possible transmission failure. If no errors are found the Central Office Computer 14 signals the Remote Monitoring Unit 19 that the data was successfully received and both the Central Office Computer 14 and Remote Monitoring Unit 19 release their respective telephone connections. If an error in transmission does occur the Remote Monitoring Unit 19 is requested to retransmit.

The selection data is posted by the Central Office Computer 14 to the individual Subscriber's account. If the account is in arrears it is desirable to restrict the Subscriber's access to the premium channel. The Central Office Computer 14 in its return message can direct the Remote Monitoring Unit 19 to turn off the access device. If Processor 6, on scanning, received data detects a "turn off" message, it outputs an appropriate signal via Control Interface 5 over Control Line 3 to disable Access Unit 1.

Transmission of data from the Central Office Computer 14 to Remote Monitoring Unit 19 is also via FSK audio tones over Telephone Line 13. The Telephone Interface 12 feeds the Audio 10 to Tone Detector 16 which changes the modulated signal to binary logic levels which are input to Communications Interface 8 via Receive Data line 17. Processor 6 periodically scans Communications Interface 8 in the receive mode to accept data until the communication is complete.

After a successful contact old selection data is cleared from memory in the Remote Monitoring Unit 19 and new selections are recorded until another contact occurs with the central computer.

It is readily apparent that certain modifications of the exemplary embodiment can be made to enhance performance without departing from the basic operating features of this invention. All such modifications are intended to be included within the scope of this invention.

What is claimed is:

1. A television use monitoring device for direct electrical connection to a telephone line, comprising:
    (a) coupling means coupled to said television for detecting when said television is actively receiving a predetermined channel and producing, in response thereto a program selection signal indicating the active reception of a particular program selection;
    (b) timer means for providing timing information;
    (c) transient memory means responsive to said coupling means to store, in response to a first control signal, said program selection signal associated with a particular program whose active reception has been detected;
(d) second memory means responsive to said transient memory means to receive the output of said transient memory means in response to a second control signal and produce the same at its output in response to a third control signal;
(e) control means responsive to said timer for periodically causing said transient memory means to store any program selection signal present in the system, and reading the contents of said transient memory means, and responsive to said transient memory means to cause said transient memory means to transfer its contents to said second memory means in response to the detection of said program selection at one point in time and a second detection of the same program selection a predetermined period of time thereafter;
(f) interface means, responsive to said control means and said second memory means to encode said program selection signal for transmission; and
(g) transmission coupling means, responsive to said interface means, to couple the output of said interface means to conventional telephone lines and transmit said program selection to a central billing facility.

2. A device as in claim 1, wherein, said interface means comprises:
(a) means for encoding the output of said second memory means into a serial binary signal; and
(b) tone generator means for converting said binary signal into a frequency shift keyed audio signal.

3. A device, as in claim 2, further comprising:
(h) means for detecting control signals from said central facility; and
(i) second control means responsive to said detecting means to disable said television when said coupling means detects active reception of said predetermined channel.

4. A device as in claim 1, wherein said interface means is responsive to periodic signals from said timer to initiate the action of said interface means and said coupling means, and futher comprising identification means for generating, in response to said initiation, an identification signal and coupling it to said interface means for transmission to said central facility.

5. A device as in claim 4, further comprising means for receiving a second identification signal over said telephone lines and actuating said identification means in response thereto.

6. A device as in claim 5, further comprising means for receiving additional information bearing signals and coupling them to said tone generator for transmission to said central billing facility.

* * * * *